(12) United States Patent
Adams et al.

(10) Patent No.: US 11,422,704 B2
(45) Date of Patent: Aug. 23, 2022

(54) ADAPTING SERVICE LEVEL POLICIES FOR EXTERNAL LATENCIES

(71) Applicant: EMC IP Holding Company LLC, Hopkinton, MA (US)

(72) Inventors: John A. Adams, San Marcos, CA (US); Arieh Don, Newton, MA (US); John R. Lynch, Pasadena, MD (US)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 17/081,217

(22) Filed: Oct. 27, 2020

(65) Prior Publication Data

US 2022/0129152 A1    Apr. 28, 2022

(51) Int. Cl.
  *G06F 3/06* (2006.01)

(52) U.S. Cl.
  CPC .............. *G06F 3/061* (2013.01); *G06F 3/067* (2013.01); *G06F 3/0655* (2013.01)

(58) Field of Classification Search
  None
  See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 7,949,637 B1 | 5/2011 | Burke | |
| 10,284,487 B2 * | 5/2019 | El-Charif | H04L 67/1012 |
| 2009/0070541 A1 | 3/2009 | Yochai | |
| 2014/0044004 A1 * | 2/2014 | Oda | H04L 43/0811 370/253 |
| 2014/0108656 A1 * | 4/2014 | Salinca | G06V 40/10 709/226 |

OTHER PUBLICATIONS

Smith et al., U.S. Appl. No. 16/260,499, filed Jan. 29, 2019, "Data Transmission Techniques Between Systems Having Different Communication Speeds."

Vokaliga et al., U.S. Appl. No. 16/155,305, filed Oct. 9, 2018, "Data Transmission Techniques Between Systems Having Different Communication Speeds."

* cited by examiner

*Primary Examiner* — Brian R Peugh
(74) *Attorney, Agent, or Firm* — Muirhead and Saturnelli, LLC

(57) ABSTRACT

Techniques for processing I/O operations in a data storage system may include: receiving I/O operations directed to a logical device associated with a service level specifying a target I/O response time goal; receiving a input identifying whether to calculate an observed I/O response time for the logical device using only an internal processing time associated with processing performed within the data storage system when servicing I/O operations directed to the logical device; determining, in accordance with the input and the I/O operations directed to the logical device, the observed I/O response time for the logical device; determining a service level violation for the first logical device whereby the observed I/O response time violates the service level; and responsive to determining the service level violation whereby the observed I/O response time violates the service level, performing processing to alleviate or remove the first service level violation.

20 Claims, 11 Drawing Sheets

ADAPTING SERVICE LEVEL POLICIES FOR EXTERNAL LATENCIES

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for processing I/O (input/output) operations in a data storage system comprising: receiving a plurality of I/O operations directed to a first logical device, wherein the first logical device is associated with a first service level specifying a target I/O response time goal; receiving a first input identifying whether to calculate a first observed I/O response time for the first logical device using only an internal processing time associated with processing performed within the data storage system when servicing I/O operations directed to the first logical device; determining, in accordance with the first input and the plurality of I/O operations directed to the first logical device, the first observed I/O response time for the first logical device; determining a first service level violation for the first logical device whereby the first observed I/O response time violates the first service level; and responsive to determining the first service level violation whereby the first observed I/O response time violates the first service level, performing first processing to alleviate or remove the first service level violation. The first input may be a user configurable input and may identify one or more time segments used to calculate the first observed I/O response time for the first logical device, and wherein the one or more time segments may be selected from a plurality of pre-defined time segments. The plurality of predefined time segments may include the internal processing time and an external processing time.

In at least one embodiment, the first input may only include the internal processing time and may exclude the external processing time associated with processing performed externally with respect to the data storage system when servicing I/O operations directed to the first logical device. The external processing time may be a first external processing time denoting an amount of time the data storage system waits for write I/O data payload to be received by the data storage system when servicing write I/O operations directed to the first logical device and denoting an amount of time the data storage system waits for read I/O data payload to be transmitted from the data storage system to an external client that requested the read I/O data when servicing read I/O operations directed to the first logical device. The plurality of predefined time segments may include a second external processing time denoting an amount of time the data storage system waits for I/O data transmissions between the data storage system and an external data storage system in connection with remote replication of the first logical device. In at least one embodiment, the first input may include the internal processing time and the first external processing time, and wherein the first input may exclude the second external processing time. The first input may include the internal processing time and the second external processing time, and wherein the first input may exclude the first external processing time.

In at least one embodiment, the first observed I/O response time may be an average I/O response time determined with respect to a plurality of I/O response times for the plurality of I/O operations directed to the first logical device. The target I/O response time goal may specify a target I/O response time range. Determining the first service level violation for the first logical device further may include: determining whether the first observed I/O response time is included in the target I/O response time range of the first service level; responsive to determining the first observed I/O response time is included in the target I/O response time range, determining that the first observed I/O response time does not violate the first service level; and responsive to determining the first observed I/O response time is not included in the target I/O response time range, determining the first service level violation whereby the first observed I/O response time violates the first service level.

In at least one embodiment, the first processing may increase an allocation of one or more resources of the data storage system for use when processing I/O operations directed to the first logical device. The first service level and a second service level may be included in a plurality of predefined service levels having an associated priority ranking, wherein the second service level may have a lower priority that the first service level in the associated priority ranking, and wherein the first processing may include reassigning a first resource from a second logical device having the second service level to the first logical device having the first service level.

In at least one embodiment, an overall I/O response time for the first logical device may include the plurality of predefined time segments with respect to I/O operations directed to the first logical device. The plurality of predefined time segments may include an internal I/O processing time for the first logical device denoting only the internal processing time with respect to I/O operations directed to the first logical device and may include an overall external processing time for the first logical device denoting only the external processing time with respect to I/O operations directed to the first logical device. Processing may include sending a notification responsive to determining that the overall I/O response time for the first logical device is not in accordance with the target I/O response time goal of the first service level and that one or more conditions included in reporting criteria are met. A specified threshold may be included in user specified reporting criteria, and processing may include sending a notification responsive to determining that the overall I/O response time for the first logical device is not in accordance with the target I/O response time goal of the first service level and that the internal I/O processing time for the first logical device exceeds the specified threshold. A specified threshold may be included in user specified reporting criteria, and processing may include sending a notification responsive to determining that the overall I/O response time for the first logical device is not in accordance with the target I/O response time goal of the first service level and that the overall external I/O processing time for the first logical device exceeds the specified threshold. A first overall wait time for the first logical device may denote an amount of time the data storage system waits for I/O data payload transmissions with respect to I/O operations directed to the first logical device, and wherein a second overall wait time for the first logical device may denote an amount of time the data storage system waits for I/O data transmissions between the data storage system and an external data storage system in connection with remote replication for the first logical device. Processing may include reporting the overall I/O response time for the first logical device, the first overall wait time for the first logical device time, the second overall wait time for the first logical device, and the internal processing time.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
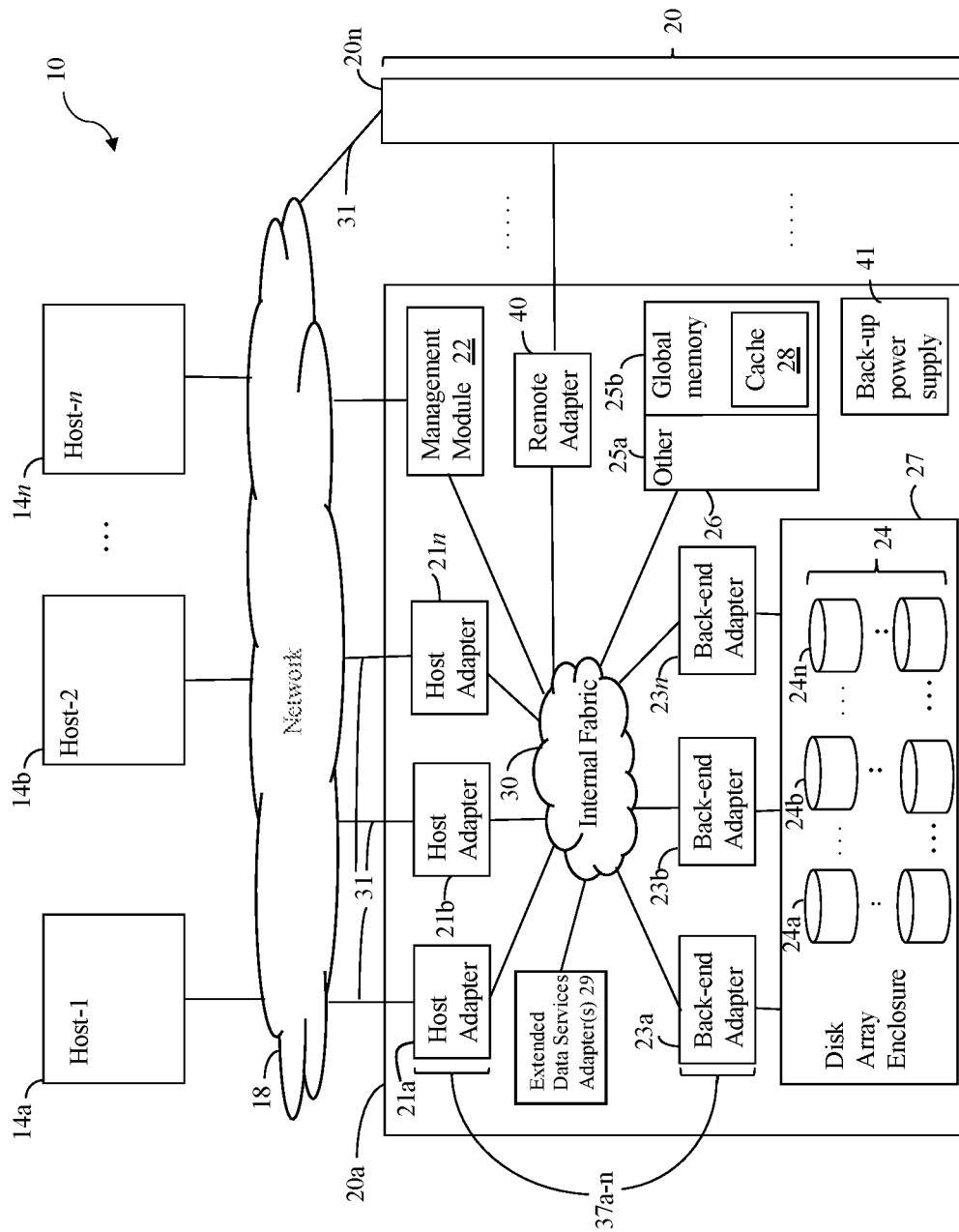
FIGS. 1 and 3 are diagrams illustrating examples of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe (Non-volatile Memory Express) over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

When the data storage system receives a read I/O operation from the host, the data storage system may determine whether the requested read data needed to service the read I/O operation is in the cache 28. If so, processing determines a read cache hit has occurred whereby the requested read data is retrieved from the cache and returned to the host. If the requested read data is not in the cache, processing determines that a read cache miss has occurred. Responsive to the read cache miss occurring, the requested read data is retrieved from the BE PDs providing the non-volatile BE storage and stored in the cache. Subsequently, the read data (now stored in the cache) is read from the cache and returned to the requesting host.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
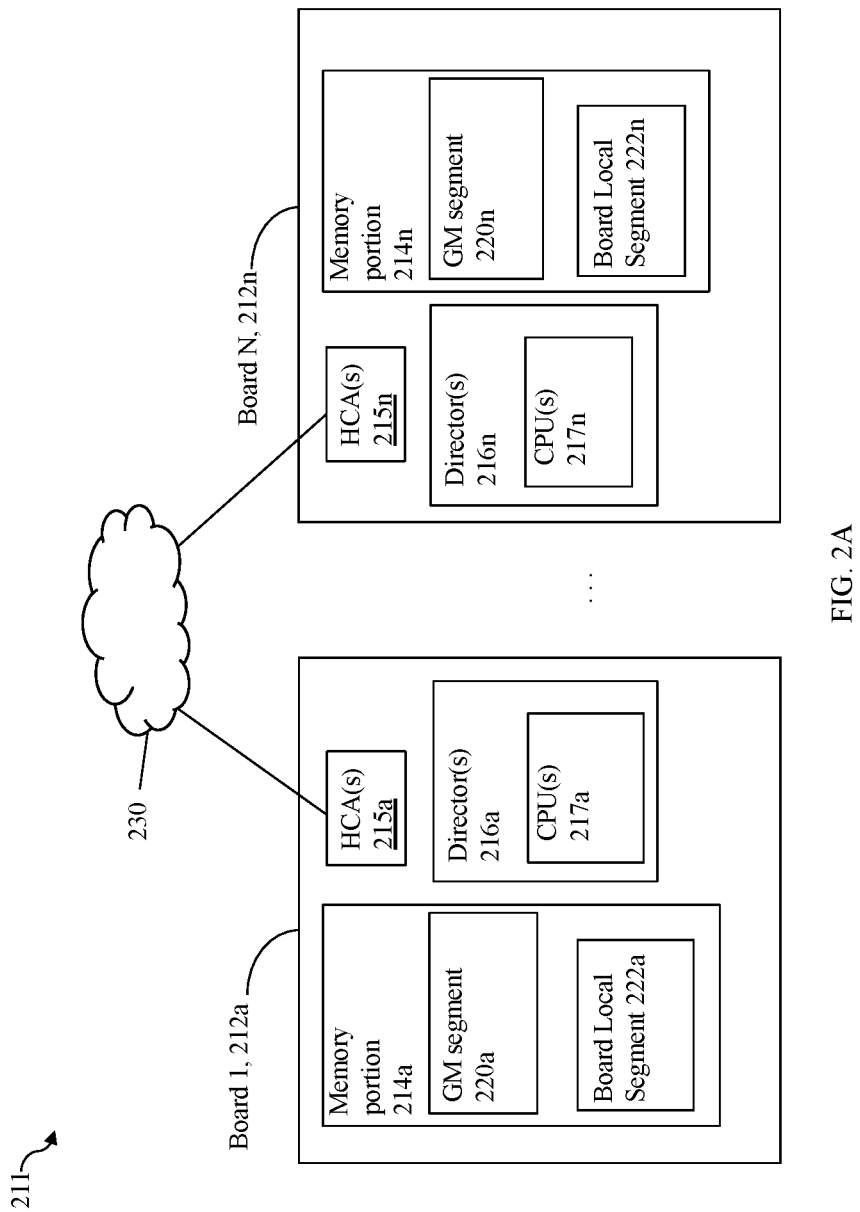
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n.

Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
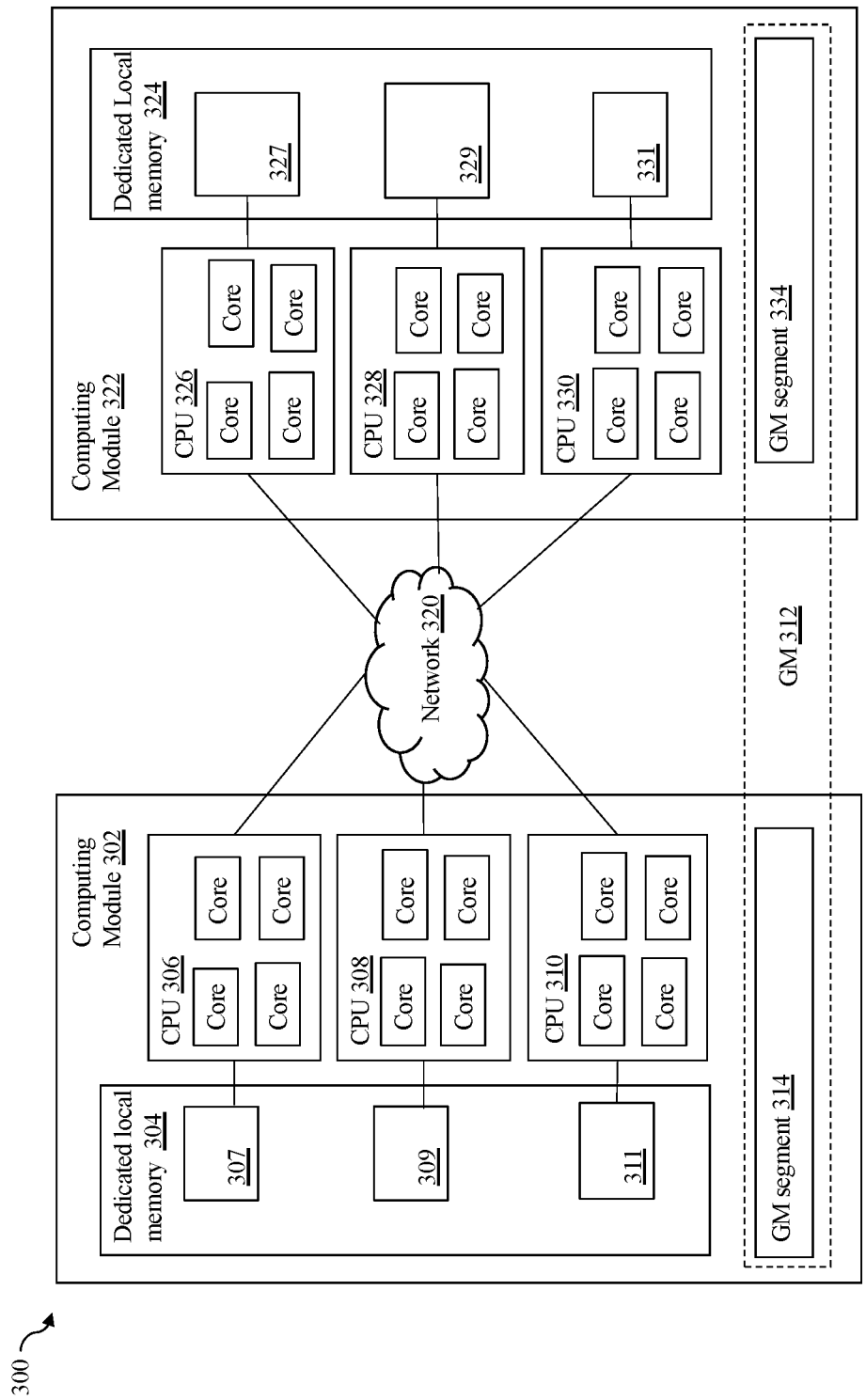
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
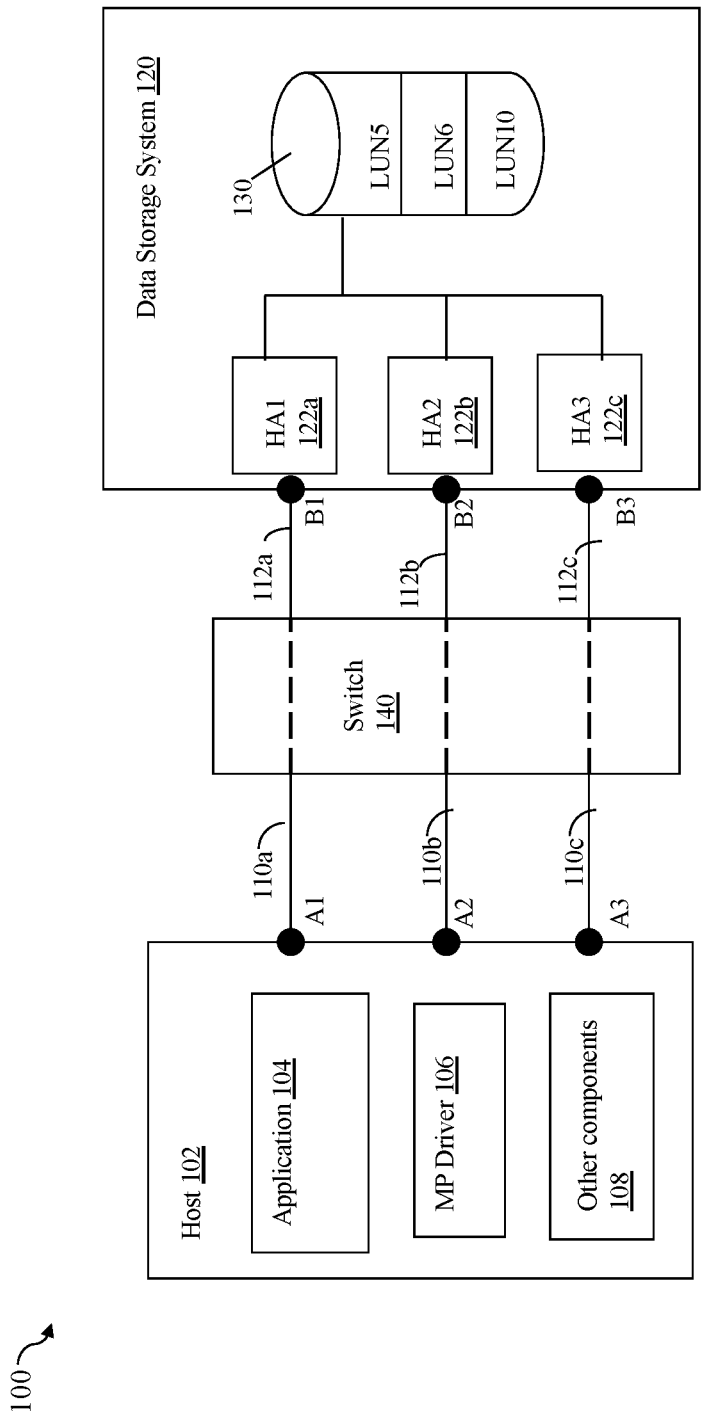

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs-LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
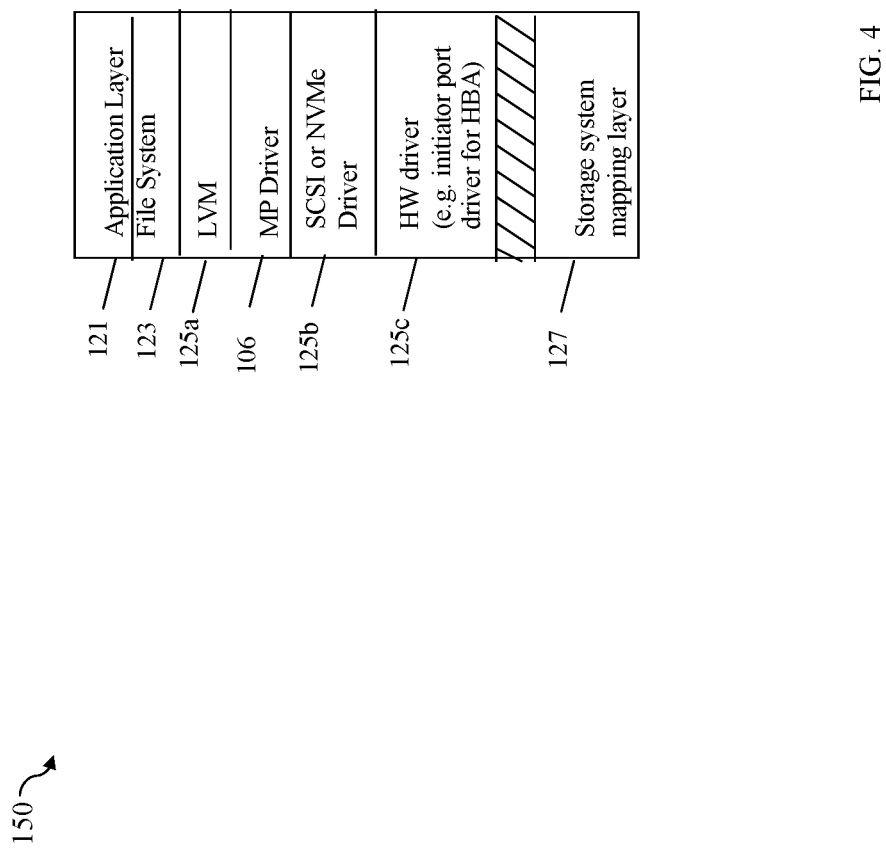
FIG. 4 is an example of a runtime stack associated with the data path or I/O path in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploadsNVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system. Masking may be used in combination with zoning to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs of the data storage system and their target ports with additional filtering or access control information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning includes allocating resources for device load balancing and may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide names (WWNs) of host interfaces (e.g., host initiator ports) and data storage system interfaces (e.g., target ports) into zones. The set of zones created may be placed into a zone set or zoning configuration which is then activated on the fabric, such as the switching fabric to define the connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new zoned connections.

Thus, zoning may be generally characterized as defining connections providing connectivity between the various host initiators and target ports. Existing connectivity including a set of connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of the switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the one or more switches (e.g., switching or network fabric) is performed to define connectivity between the host(s) and data storage system(s). In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWN and the masking information identifies which initiator WWNs are allowed to access particular LUNs on each target port WWN of the data storage system. In the MV for a host, the IG may identify the WWNs of host initiators and the PG may identify the WWNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5:
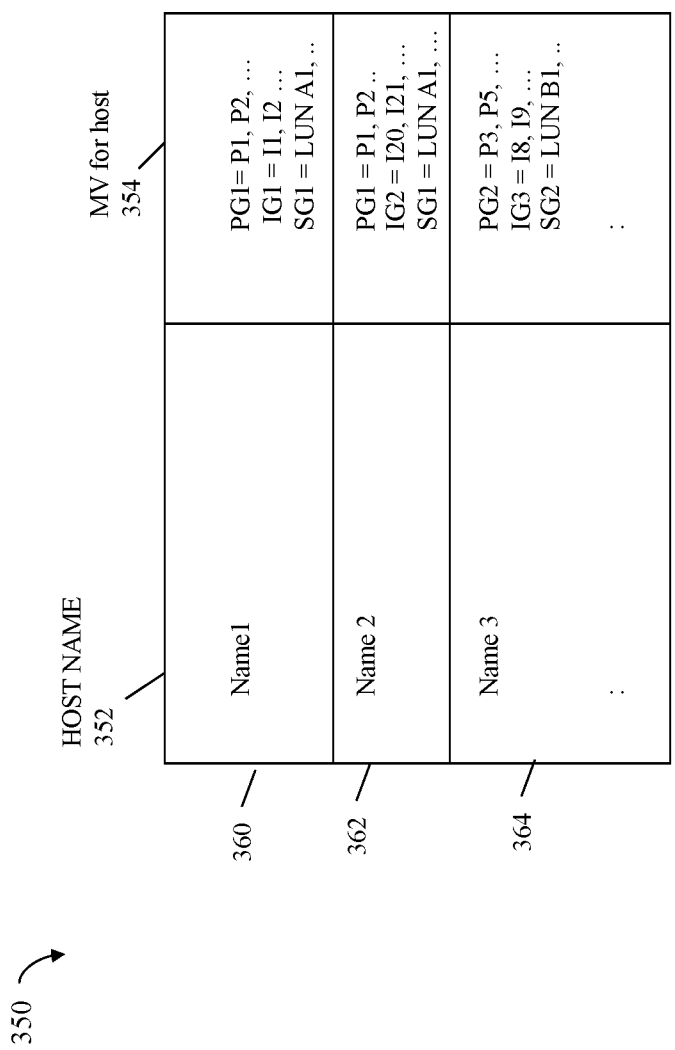
FIG. 5 is an example of masking information that may be used in an embodiment in accordance with the techniques herein.

Referring to FIG. 5, shown is an example of masking information that may be created and used in an embodiment in accordance with techniques herein. In the example 350, shown is a table of MVs for a plurality of hosts. Each row of the table denotes an MV instance in column 354 configured for a particular host identified in column 352 of the same row. The table 350 may index or provide access to MVs using the host's unique HOST NAME (column 352) as described elsewhere herein. For example, consider an embodiment in which the table 350 is indexed and accessed by HOST NAME in column 352. (e.g., Each host's HOST NAME denoted in column 352 uniquely identifies a particular host). Generally, the example 350 uses the notation PGn, n being an integer greater than 0, to identify an instance of a PG; uses the notation IGn to identify and instance of an IG; and uses the notation SGn to identify an instance of a SG. In a PG, Pn may denote a target port WWN. In an IG, In may denote an initiator port WWN.

Row 360 may denote a first host having a HOST NAME of Name 1 (as in column 352 of row 360) with an MV as specified in column 354 of row 360. As illustrated in column 354 of row 360, the first host has a first MV including port group PG1, initiator group IG1, and storage group SG1. Row 362 may denote a second host having a HOST NAME of Name 2 (as in column 352 of row 362) with an MV as specified in column 354 of row 362. As illustrated in column 354 of row 362, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 360 and 362. Row 364 may denote a third host having a HOST NAME of Name 3 (as in column 352 of row 364) with an MV as specified in column 354 of row 364. As illustrated in column 354 of row 364, the third host has a third MV including port group PG2, initiator group IG3, and storage group SG2.

In at least one embodiment in accordance with techniques herein, the host may perform processing, such as when the host is booted, to discover and establish connectivity between the host and data storage system. In particular, the host may perform processing to discover and establish connectivity with the switch (e.g., more generally network or switching fabric) and also between the switch and data storage system. For example, an HBA initiator port of a host may log into the switch and provide identifying information of the initiator port, such as the initiator port's WWN. The switch may provide the initiator port with information regarding what data storage system target ports are visible or exposed from the switch. In turn, the host initiator port may then proceed to login to the target ports of the data storage system where the host initiator port provides its WWN along with possibly other configuration information, such as the HOST NAME, sent during the login.

Thus, in at least one embodiment, zoning may be performed with respect to one or more switches of the SAN fabric between a host and a data storage system. The data storage system may then further determine whether to allow or disallow a host's I/O operation directed to a LUN, where the I/O is received on a path from a host initiator port to a data storage system target port, based on masking information such as illustrated in FIG. 5.

A data storage system may perform one or more data services such as remote replication. With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet, Fibre Channel, or other suitable transmission channel supporting messaging traffic between data storage systems. The RA may be hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one data storage system to the other in accordance with a particular replication mode, such as a synchronous or an asynchronous mode described elsewhere herein. Generally, the Dell EMC™ SRDF® products are one example of commercially available products that may be used to provide functionality of a remote data facility (RDF) for use in an embodiment in connection with the techniques herein.

Remote replication is one technique that may be used in connection with providing for disaster recovery (DR) of an application's data set. The application, such as executing on a host, may write to a production or primary data set of one or more LUNs on a primary data storage system. Remote replication, such as using RDF, may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system.

The following paragraphs initially provide a more detailed description of a RDF that may be used to automatically perform remote data replication in an embodiment in accordance with the techniques herein. Additionally, the following paragraphs also provide some example remote replication configurations that may be used in an embodiment in accordance with the techniques herein.

Figure 6:
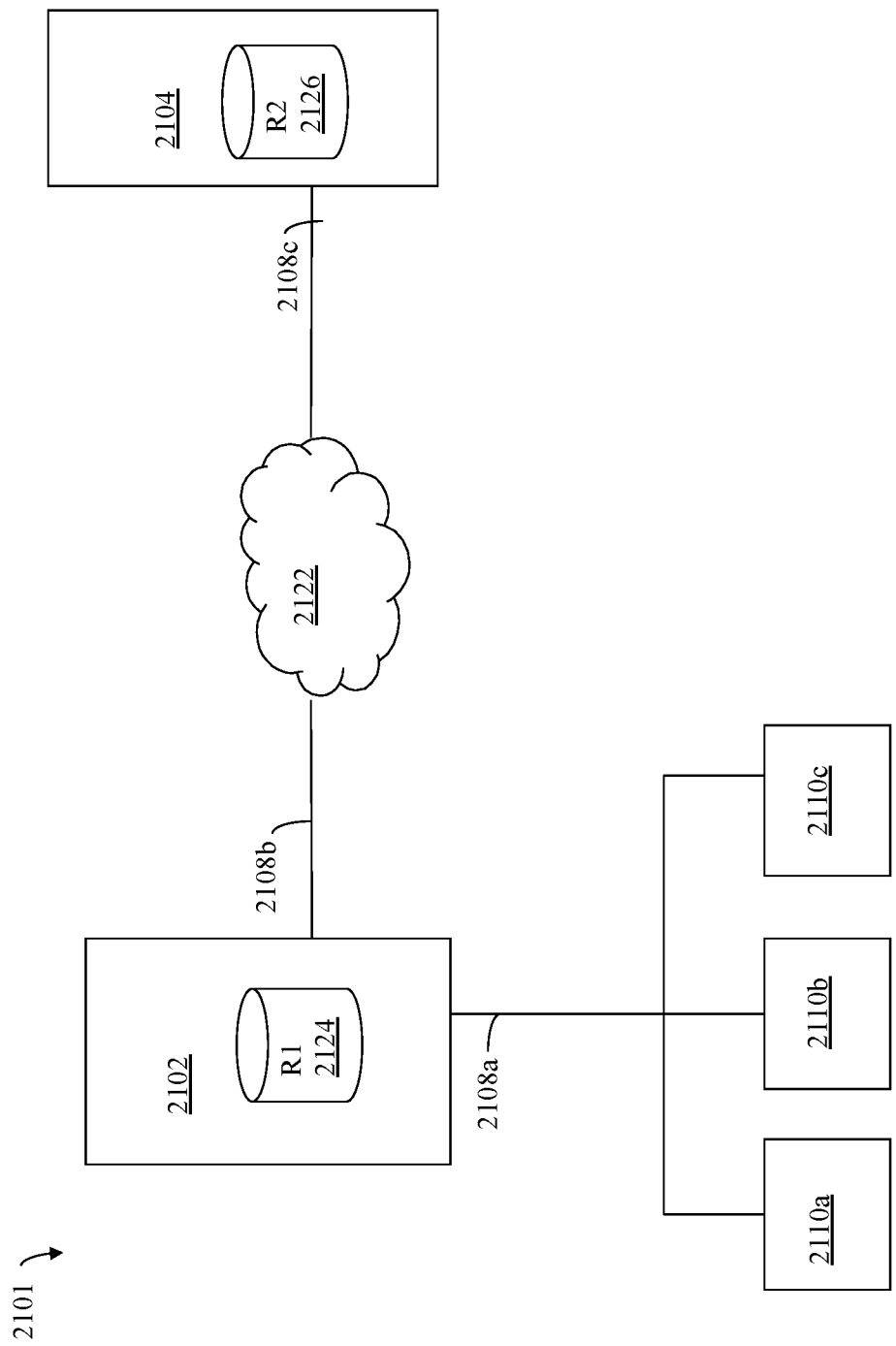
FIGS. 6, 7 and 8 are examples illustrating remote replication configurations that may be used in an embodiment in accordance with the techniques herein.

Referring to FIG. 6, shown is an example of an embodiment of a system 2101 that may be used in connection with the techniques described herein. It should be noted that the embodiment illustrated in FIG. 6 presents a simplified view of some of the components illustrated in FIGS. 1, 2A and 3B, for example, including only some detail of the data storage systems 12 for the sake of illustration.

Included in the example 2101 are the data storage systems 2102 and 2104; and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection. Although not illustrated, the hosts 2110a-2110c may also be directly connected to a network such as the Internet.

The data storage systems 2102 and 2104 may include one or more devices. In this example, the data storage system 2102 includes the storage device R1 2124, and the data storage system 104 includes the storage device R2 2126. Both of the data storage systems may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Dell EMC™ SRDF® products. Communication between the data storage systems providing remote replication using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first storage device, such as R1, as a primary storage device and a second storage device, such as R2, as a secondary storage device. Other incarnations of Dell EMC™ SRDF® may provide a peer to peer relationship between the local and remote storage devices. In this example, the host 2110a interacts directly with the device R1 of the data storage system 2102, and any data changes made are automatically provided to the R2 device of the data storage system 2104 using Dell EMC™ SRDF®. In operation, the host 110a may read and write data using the R1 volume in 2102, and Dell EMC™ SRDF® may handle the automatic copying and updating of data from R1 to R2 in the data storage system 2104.

As illustrated in connection with other figures herein, the data storage system 2102 may have one or more RAs included therein to facilitate remote connections to the data storage system 2104. Communications between the storage systems 2102 and 2104 may be made over connections 2108b, 2108c to the network 2122. The data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group (also referred to as a replication group) of devices (e.g., LUNs). Rather than have a single R1 device and a single R2 device, a replication group may be defined includes a source group of devices, such as devices of the data storage system 2102, and includes a corresponding target group of devices, such as devices on data storage system 2104. The devices in the source group may be mirrored in corresponding devices of the target group using Dell EMC™ SRDF® functionality.

In at least one embodiment, SGs may be supported. Consistent with other discussion herein, a SG may be a logically defined group of one or more LUNs, or more generally devices, in a data storage system. In connection with RDF, a source SG may be defined on the primary or R1 data storage system where the source SG includes one or more LUNs used by an application. The source SG may include the R1 devices of the R1-R2 device pairings used in connection with RDF. A target SG may be defined on the secondary or R2 data storage system where the target SG includes a corresponding replica or copy for each LUN in the source SG. Each LUN in the source SG is uniquely paired with a corresponding LUN in the target SG, where the corresponding LUN is a replica of associated LUN from the source SG. The target SG may include the R2 devices of the R1-R2 RDF device pairings used in connection with RDF. Collectively, the R1-R2 RDF device pairs represented by the source SG and its corresponding target SG of device replicas may be referred to as a replication group. To further illustrate, assume the source SG includes LUN A1 and LUN B1 and the target SG includes LUN A2 and LUN B2, where LUN A1 and LUN A2 are configured as a first RDF device pairing (e.g., LUN A1 is the R1 device of the first RDF pairing and LUN A2 is the R2 device of the first RDF pairing), and where LUN B1 and LUN B2 are configured as a second RDF pairing (e.g., LUN B1 is the R1 device of the RDF pairing and LUN B2 is the R2 device of the second RDF pairing).

Discussion herein may refer to examples using an RDF device pairing with a single R1 device paired with a single R2 device. However, more generally, the same concepts described herein with respect to a single RDF device pairing also applies to the multiple RDF device pairings of a replication group.

An embodiment of the data storage system may include Dell EMC™ SRDF®, or more generally any RDF, operating in one or more different supported replication modes. For example, such modes may include Dell EMC™ SRDF® operating in synchronous mode, asynchronous mode, adaptive copy mode, and possibly other supported modes some of which are described herein. Generally, the different replication modes address different service level requirements and determine, for example, how R1 devices are remotely mirrored across the replication links, how I/Os are processed, when the host receives acknowledgment of a write operation relative to when the write is replicated, and when writes or updates are sent to R2 partner devices.

In at least one embodiment, a primary replication mode may be configured for each RDF device pairing where the primary mode may be synchronous, asynchronous or possibly another supported replication mode.

To further illustrate primary replication modes in connection with Dell EMC™ SRDF®, the host may issue a write to an R1 device in a first data storage system and the data change is propagated to the R2 device in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Remote data replication may be performed in a synchronous manner or mode, such as using Dell EMC™ SRDF® operating in a synchronous mode (Dell EMC™ SRDF®/S). With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in the synchronous mode, such as Dell EMC™ SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including WP data as mentioned elsewhere herein. The write data may be propagated across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation. In at least one embodiment, asynchronous replication such as with respect to a defined R1-R2 device pairing places the host writes to the R1 device into 'cycles' or 'chunks' and then transfers an entire chunk of writes to the target system for storing in the paired R2 device.

Figure 7:
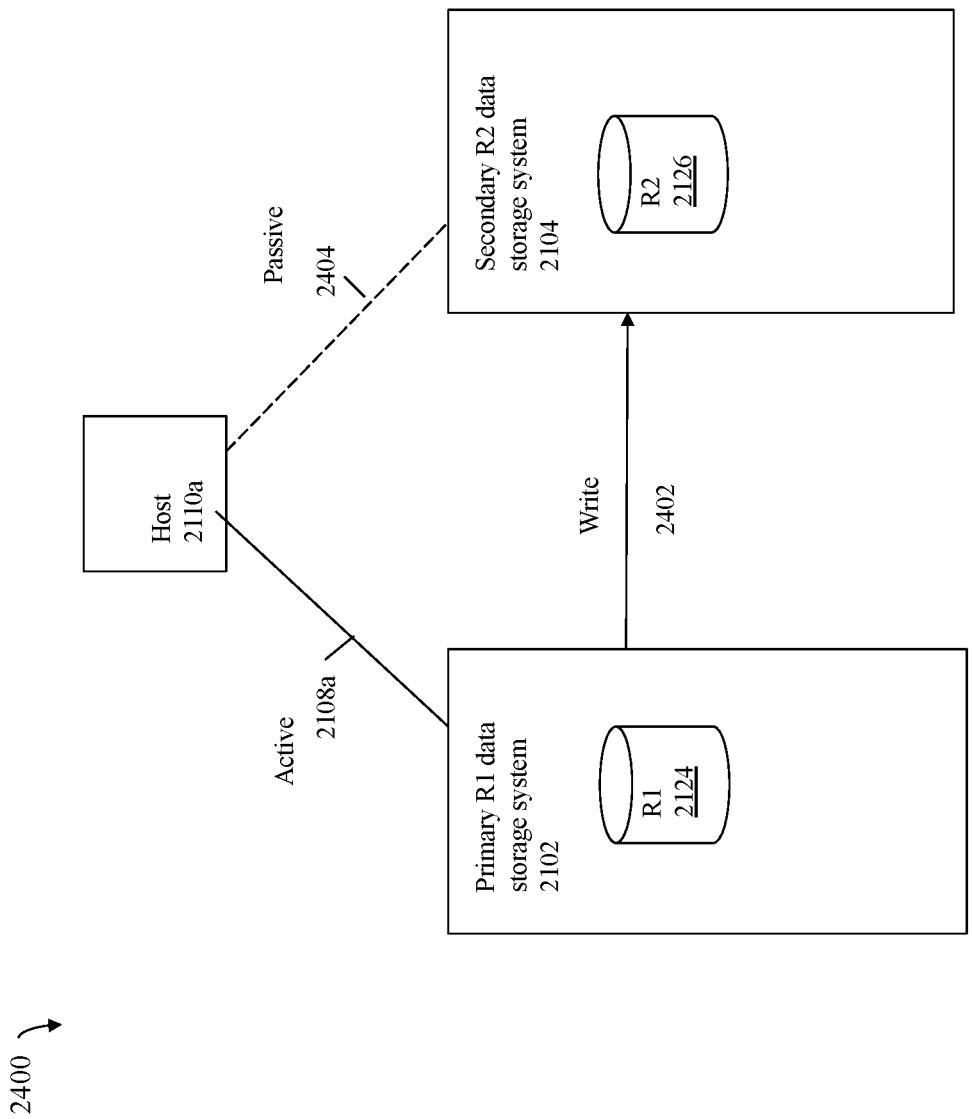

With reference to FIG. 7, shown is a further simplified illustration of components that may be used in an embodiment in accordance with the techniques herein. The example 2400 is simplified illustration of components as described elsewhere herein. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 7 may also be referred to herein as an active-passive configuration such as may be used with synchronous replication and other supported replication modes where the host 2110*a* has an active connection or path 2108*a* over which all I/Os are issued to only the R1 data storage system. The host 2110*a* may have a passive connection or path 2404 to the R2 data storage system 2104. In the configuration of 2400, the R1 device 2124 and R2 device 2126 may be configured and identified as the same LUN, such as LUN A, to the host 2110*a*. Thus, the host 2110*a* may view 2108*a* and 2404 as two paths to the same LUN A where path 2108*a* is active (over which I/Os may be issued to LUN A) and where path 2404 is passive (over which no I/Os to the LUN A may be issued). For example, the devices 2124 and 2126 may be configured to have the same logical device identifier such as the same world wide name or identifier as well as having other attributes or properties that are the same. Should the connection 2108*a* and/or the R1 data storage system 2102 experience a failure or disaster whereby access to R1 2124 configured as LUN A is unavailable, processing may be performed on the host 2110*a* to modify the state of path 2404 to active and commence issuing I/Os to the R2 device configured as LUN A. In this manner, the R2 device 2126 configured as LUN A may be used as a backup accessible to the host 2110*a* for servicing I/Os upon failure of the R1 device 2124 configured as LUN A.

It should be noted although only a single RDF link 2402 is illustrated, more generally any number of RDF links may be used in connection with replicating data from systems 2102 to system 2104 in connection with techniques herein.

Consistent with discussion herein, rather than have a single RDF device pairing of R1 2124 and R2 2126 in a replication group in connection with FIG. 7, multiple RDF device pairings may be defined and included in the same replication group.

Figure 8:
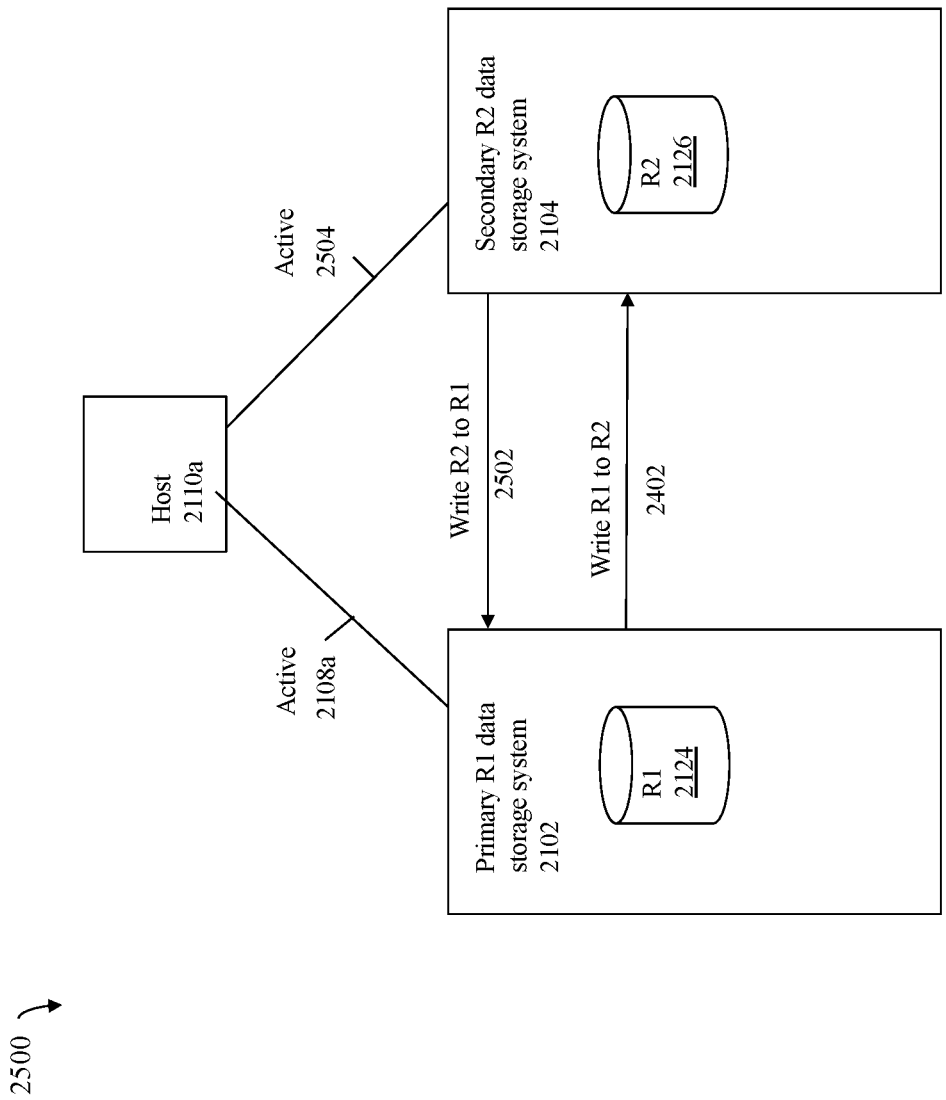

Referring to FIG. 8, shown is another example configuration of components that may be used in an embodiment in accordance with the techniques herein. The example 2500 illustrates an active-active configuration as may be used in connection with synchronous replication in at least one embodiment in accordance with the techniques herein. In an active-active configuration with synchronous replication, the host 2110*a* may have a first active path 2108*a* to the R1 data storage system and R1 device 2124 configured as LUN A. Additionally, the host 2110*a* may have a second active path 2504 to the R2 data storage system and R2 device 2126 configured as LUN A. From the view of the host 2110*a*, paths 2108*a* and 2504 appear as 2 paths to the same LUN A as described in connection with FIG. 7 with the difference that the host in the example 2500 configuration may issue I/Os, both reads and/or writes, over both of paths 2108*a* and 2504. The host 2110*a* may send a first write over path 2108*a* which is received by the R1 system 2102 and written to cache of the R1 system 2102 where, at a later point in time, the first write is destaged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110*a* over path 2108*a* that the first write has completed.

The host 2110*a* may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110*a* over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108*a* to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108*a* is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 8 has the R2 system 2104 act as another primary data storage system which facilitates propagation of writes received at the data storage system 2104 to the data storage system 2102. It should be noted that although FIG. 8 illustrates for simplicity a single host accessing both the R1 device 2124 and R2 device 2126, any number of hosts may access one or both of the R1 device 2124 and the R2 device 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with the techniques herein, the Fibre Channel (FC) protocol may be used in connection with communications (e.g., over the SAN including the RDF links) between the data storage system 2102 and 2104.

Consistent with discussion herein, rather than have a single RDF device pairing of R1 2124 and R2 2126 in a first replication group in the FIG. 8, multiple RDF device pairings may be defined and included in the same first replication group. Also rather than have a single RDF device pairing in a second replication group where the device 2126 acts as the primary or R1 device and the device 2124 acts as the secondary or R2 device for facilitating replication of writes such as denoted by 2502, multiple RDF device pairings may be defined and included in the same second replication group.

FIGS. 6, 7 and 8 illustrate some supported RDF configurations in at least one embodiment. Other remote replication configurations may also be supported. For example, FIG. 6 illustrates what may be referred to as a single replication leg or hop between 2 data storage systems 2102, 2104. An embodiment may support additional replication legs or hops. For example, consider a cascaded arrangement where the data storage system 2104 may further replicate data of the R2 2126 to yet another third data storage system. In this cascaded arrangement, the foregoing 3 data storage systems may form a chain with 2 replication legs. Each of the replication legs may be configured with any supported replication mode, such as synchronous or asynchronous replication mode. For example, in the above-noted cascaded arrangement the 2 replication legs may be configured for the synchronous replication mode. As another example again with reference to FIG. 6, the data storage system 2102 may further replicate the data of R1 2124 to a third data storage system. In this latter arrangement, the source R1 2124 is remotely replicated to both the system 2104 as well as the third data storage system to thereby provide 2 remote copies of R1 2124 (e.g., a first remote copy R2 2126 on the system 2104 as well a second remote copy on the third data storage system).

A data storage system may define multiple service levels or SLs denoting different performance targets or goals for I/O operations received at the data storage system. The data storage system may provide a multi-tenant (MT) environment whereby multiple tenants or clients, such as applications, store their data on the data storage system. In such an environment, different service levels or SLs may be specified for different data sets or storage objects. The SL associated with a particular data set or storage object defines a target performance level for the particular associated data set or storage object used by the application. For example, a SL may be related to a target level of performance or service with respect to I/O operations serviced at the data storage system. The SL specified may be expressed in terms of one or more metrics, such as based on I/O RT (response time), target I/O throughput (e.g., I/O rate such as I/Os per second), data throughput (e.g., megabytes per second), and the like. For example, the SL specified may include an average RT with respect to I/Os issued to a particular logical defined data set. To further illustrate, a SL may specify an average RT of 3 milliseconds (ms.) for a particular data set whereby the target or goal for the data set is to have an observed or measured average I/O RT of 3 ms (milliseconds) for the data set, or more generally, for each storage object in the data set. In some systems, the SL may denote a target RT range that is a contiguous range of RT values. For example, a SL may be expressed as a target RT range X, where 2.5 ms,<X<3 ms. The client, such as an application, may also be referred to as a consumer of the data storage system (and data storage system resources) where the consumer's data is stored on the data storage system. A single client or consumer may be, for example, an application executing on a host. A single host may have one or more applications.

In some existing data storage systems, a SL may be specified for each logical group of one or more LUNs, such as for an SG of LUNs, or other storage objects. More generally, as noted above, a SL may be specified for a logical grouping of data storage objects. Generally, the SL for an SG may be characterized as the performance target or goal performance for the SG. The data storage system may perform processing to control, achieve or regulate I/Os and resources utilized for processing such I/Os in order to maintain the goals or targets of the SL. A SL violation may occur, for example, when an observed I/O RT for an SG or its storage objects does not meet the I/O RT specified by the SL for the SG. A SL violation may occur if the measured or observed I/O RT performance for the SG is above or below the target SL performance. Responsive to such a SL violation not meeting the target performance goal of the SL, remediation processing may be performed to attempt to alleviate, and, if possible, eliminate, the SL violation. A SL may be assigned to each defined logical SG of one or more LUNs or other storage objects, as noted above, where an I/O directed to any storage object of the SG has the same SL (as specified for the SG).

In existing systems, for a storage object such as a LUN belonging to an SG having an associated SL, an I/O directed to the LUN may be assigned a target RT, and thus prioritized for servicing, based on the SL associated with the SG and thus associated with the LUN.

Multiple predefined SLs may be specified. In at least one embodiment, multiple SLs may be defined each specifying different target performance objectives such as with respect to I/Os. For example, an embodiment may include the following service levels, from highest service and performance level to lowest service and performance level: Diamond, Platinum, Gold, Silver, and Bronze. An embodiment may include service levels different from those described herein. Each service level may have an associated target response time (RT) range where, for example, Diamond has the highest performance goals and thus the lowest target RT range of all the service levels. In contrast to Diamond, Bronze may have the lowest performance goals and thus the highest target RT range of all the service levels listed. It should be noted that other embodiments may have additional and/or different service levels than as noted above and used elsewhere herein for purposes of illustration. For example, for illustration only, the following may denote the target RTs for the different predefined SLs, where the values for X denote the target RT range for the associated SLs:

| SL | Target RT range |
|---|---|
| Diamond | X < 0.8 ms. |
| Platinum | X < 1.0 ms. |
| Gold | 1.5 ms < X < 2.0 ms |
| Silver | 2.0 ms < X < 3.0 ms. |
| Bronze | 4.0 ms. < X < 5.0 ms. |

The foregoing SLs may be characterized as a list of predefined SLs. Additionally, the predefined SLs may have an associated priority ranking, from the highest priority SL to the lowest priority SL, as follows: Diamond, Platinum, Gold, Silver and Bronze. The RTs in the target RT range may based on average observed I/O RTs for each LUN.

In at least one existing data storage system, measured RT for I/Os received at the data storage system may be measured based on a starting time when the I/O command data block (CDB) is received at the data storage system, and then end with an ending time when the data storage system acknowledges completion of the I/O operation by returning an acknowledgement to the host or other client that sent the I/O operation. Generally, an I/O operation processed at the data storage system may include a CDB including information such as identifying the type of I/O operation (e.g., whether the command is a read or a write). The I/O operation may also include I/O operation data or payload that includes the data of the I/O operation. For a write I/O operation sent from the host to the data storage system, the write I/O operation includes the write data payload to be written on the data storage system, where the write data payload is sent from the host to the data storage system. For a read I/O operation sent from the host to the data storage system, the read data payload is returned from the data storage system to the host.

To further illustrate, consider a write I/O received at the data storage system from the host. The write CDB may be received and the data storage system measures the write I/O RT based on a starting time from when the write CDB is received. After the write CDB is sent by the host, the write I/O data payload is then sent from the host the data storage system. The write I/O data payload may be transmitted over a path where additional delays occur such as, for example, due to network congestion at a switch in the path, due to the host being overloaded and thus slow in transmitting all the write I/O data payload, and the like. For example, the write I/O data payload may pass through a switch that has a large amount of data traffic causing additional transmission delays. Thus, the data storage system may wait an additional amount of time, such as 3 milliseconds or more, for the write I/O data payload to be sent from the host and received at the data storage system. The data storage system may store the received write data payload in the cache where, for example, such processing may take 0.2 milliseconds to store the received write data in the cache. Once the write data is stored in the cache, the data storage system may return an acknowledgement to the host regarding successful completion of the write I/O operation. The data storage system may stop measuring the write I/O RT once the foregoing acknowledgement is sent. Thus, the measured RT for the write I/O includes the additional time of 3 milliseconds or more due to the switch, network or other delay. The measured RT for the write I/O and other I/Os directed to a particular LUN may result in the data storage system determining that the observed or measured average I/O RT for the LUN exceeds the target I/O RT of a SL for the LUN. For example, the measured average I/O RT for the LUN may be 4 milliseconds and the LUN may have an associated SL of platinum with a target I/O RT of less than 1 millisecond. In this case, the data storage system may determine there has been a SL violation for the LUN and perform processing that attempts to reduce the measured RT for I/Os directed to the LUN. The data storage system may, for example, allocate additional resources for use when processing I/Os directed to the LUN, may prioritize I/Os directed to the LUN over other I/Os directed to other LUNs having an associated SL with a priority less than platinum, and the like. However, in the above example, the adverse impact on measured RT for the LUN is not due to conditions within the data storage system and may rather be due to external conditions and causes.

Described in the following paragraphs are techniques that may be used to determine various time segments comprising overall I/O RT. Overall I/O RT may be defined as described above for an I/O operation received at the data storage system. For such an I/O operation, the overall I/O RT may denote the amount of time starting from when the I/O CDB is received until the acknowledgement regarding completion of the I/O is sent to the requesting host. In at least one embodiment, an average overall I/O RT may be determined for a LUN with respect to I/Os directed to the LUN. The overall I/O RT may be based generally on a combination of internal processing time within the data storage system and also external processing time denoting processing performed externally with respect to the data storage system. Generally, the overall I/O RT may be based on multiple individual time segments determined for each I/O operation. The multiple time segments may include the internal processing time associated with processing performed internally within the data storage system as well as one or more additional time segments. The additional time segments may collectively denote the external processing time associated with the I/O operation. An average may also be determined for each of the individual multiple time segments for the LUN with respect to I/Os directed to the LUN.

Consistent with other discussion herein, the internal processing time for an I/O operation denotes the amount of time related to internal data storage system processing performed for servicing the I/O operation. The internal processing time may also include any wait times that the I/O waits in data storage system internal queues for processing. For an I/O operation, the internal processing time may include the amount of time that the I/O operation may wait for processing in an FA's data storage system internal queue, and the amount of time the I/O operation may wait in a DA's data storage system internal queue for processing. If the I/O is a write I/O operation, the internal processing time may include the amount of time to obtain a cache slot, store the write data in the cache slot, and return an acknowledgment to host regarding completion of the write I/O. If the I/O operation is a read cache hit, the internal processing time may include the amount of time to retrieve the requested read data from the cache, return the read data to the host, and return an acknowledgment or status to the host regarding the read operation. If the I/O operation is a read cache miss, the internal processing time may include the amount of time to obtain the requested read data from a BE PD and store the read data in the cache, retrieve the read data from the cache and return the read data to the host, and return an acknowledgement or status to the host regarding the read operation.

The additional time segments comprising the external processing time may include a first time segment denoting an amount of time the data storage system waits for I/O data payload to be transmitted. If the I/O is a write I/O operation, the first time segment may denote the amount of time the data storage system waits for all the write I/O data payload to be received by the data storage system. In at least one embodiment, the first time segment for a write I/O operation may denote an amount of time measured from when the write I/O CDB is received at the data storage system until the ending time when all the write I/O data payload of the write I/O operation is received at the data storage system. If the I/O is a read I/O operation, the first time segment may denote the amount of time the data storage system waits for all the requested read I/O data payload to be transmitted from the data storage system. In at least one embodiment, the first time segment for a read I/O operation may denote an amount of time measured from when the read I/O CDB is received at the data storage system until the ending time when all the read data of the read I/O operation has been transmitted from the data storage system.

The additional time segments comprising the external processing time may include a remote replication time segment denoting the amount of time the data storage system waits for data to be transmitted to a remote data storage system in connection with remote replication. Thus, the remote replication time segment may denote the amount of time spent transmitting data for remote replication purposes between the data storage system and one or more other remote data storage systems.

In at least one embodiment, averages for each of the overall I/O RT, internal processing time, remote replication time segment, and the time segment denoting an amount of time the data storage system waits for I/O data payload to be transmitted may be determined for a LUN. The foregoing averages may be measured and reported to a user of the data storage system.

In at least one embodiment in accordance with the techniques herein, a user may configure the particular one or more time segments used in determining a SL violation for a LUN. For example, the above-noted time segments may be predefined time segments from which a user may select. The selected one or more time segments may be used in connection with calculating a measured or observed I/O RT for a LUN that is compared to the target I/O RT goal of the SL for the LUN. For example, a user may select to only use the internal processing time when determining the measured I/O RT for the LUN that is compared to the target I/O RT goal of the SL for the LUN. In this case, the average internal processing time for I/Os directed to the LUN may be compared to the target I/O RT range of the SL for the LUN. If the average internal processing time is within the target I/O RT range, there is no SL violation for the LUN. Alternatively, if the average internal processing time is not within the target I/O RT range, there is a SL violation for the LUN. Responsive to the SL violation for the LUN, the data storage system may perform processing to alleviate or remove the SL violation. For example, such processing may include allocating additional resources (e.g., cache, CPU time, memory, FA bandwidth) for use in servicing I/Os directed to the LUN, temporarily prioritizing I/O directed to the LUN over other I/Os directed to other LUNs of lower priority, and the like.

The foregoing as well as other aspects of the techniques herein are described in more detail in the following paragraphs.

Consistent with other discussion herein, the overall I/O RT for an I/O includes internal processing time within the data storage system as well as external processing time with respect to processing performed externally or outside of the data storage system. The external processing time may include time delays that the data storage system waits for data of the I/O operation to be transmitted over a SAN or switching fabric. For example, reference is made back to FIG. 3 and with respect to a write operation. The switch 140 and/or host 102 may have a heavy I/O workload and thus additional delays may be introduced when transmitting the write data from the host 102 to the data storage system 120. As another example, reference is made back to FIG. 3 and with respect to a read operation. The switch 140 and/or host 102 may have a heavy I/O workload and thus additional delays may be introduced when transmitting the read data from the data storage system 120 to the host 102. External processing time related to such delays in the SAN or switching fabric may also be due to congestion in the SAN or switching fabric such as due to disparate transmission speeds causing a problem sometimes referred to as a "slow drain" problem. The foregoing problem is described, for example, in EMS-725US, U.S. application Ser. No. 16/260,499, filed Jan. 29, 2019, DATA TRANSMISSION TECHNIQUES BETWEEN SYSTEMS HAVING DIFFERENT COMMUNICATION SPEEDS, Smith et al., and in EMS-712US, U.S. application Ser. No. 16/155,305, filed Oct. 9, 2018, DATA TRANSMISSION TECHNIQUES BETWEEN SYSTEMS HAVING DIFFERENT COMMUNICATION SPEEDS, Vokaliga et al., both of which are incorporated herein in their entirety.

The external processing time may also be due to external processing performed in connection with transmitting replication data. For example and with reference to FIG. 8, the external processing time may include additional time due to transmitting data between the systems 2102 and 2104 such as for the active-active configuration of FIG. 8 with synchronous replication. To further illustrate, reference is made to FIG. 6 where an I/O operation is sent from one of the hosts 2110a-c to the data storage system 2102. The I/O operation may be a write I/O operation directed to R1 2124 that is remotely replicated in a synchronous manner as R2 2126 on the system 2104. In this case, the CDB of the write I/O operation may be received at the system 2102 at a time T1. All of the write data payload may not be received until a later point in time T2. Once the write data payload is received, the system 2102 may store the write data in its local cache (not illustrated). At a third point in time T3 subsequent to T2, the system 2102 may start sending the write data to the system 2104 as part of the automated replication processing performed using a RDF to replicate writes to R1 2124 to the remote device R2 2126. At a fourth point in time T4 subsequent to T3, the system 2102 has completed sending the write data to the system 2104 and the system 2102 receives an acknowledgement from the system 2104 regarding completion of storing the write data in its cache. At time T5 subsequent to T4, the system 2102 returns an acknowledgement to the one of the hosts 2110a-c that sent the write operation. In connection with the foregoing example, the overall I/O RT may be denoted by the amount of time between T1 and T5 (e.g., computed as T5-T1); the internal processing time may be denoted by the sum of the first amount of time between T2 and T3 and the second amount of time between T4 and T5; the amount of time the data storage system waits for transmission of the write I/O data may be denoted by the amount of time between T1 and T2; and the amount of time transmitting data for remote replication may be denoted by the amount of time between T3 and T4. Generally, the overall I/O RT includes the internal processing time that may be expressed as (T3−T2)+(T5−T4) and includes external processing time that may be expressed as (T2−T1)+(T4−T3).

In connection with determining a SL violation with the techniques herein, a configurable measured or observed RT may be used to allow a user or customer of the data storage system to exclude one or more time segments contributing to the external processing time. For example, in at least one embodiment, the configurable measured or observed RT may take into account only the internal processing time. In this manner, the data storage system may take an action responsive to a SL violation when the SL violation is due to conditions only within the data storage system. As a variation, a user may also select to have the configurable measured or observed RT take into account the internal processing time and one or more other time segments contributing to the external processing time. The configurable measured or observed RT allows the user to specify whether or not to have the data storage system perform processing to alleviate or remove a SL violation due to external processing time.

Figure 9A:
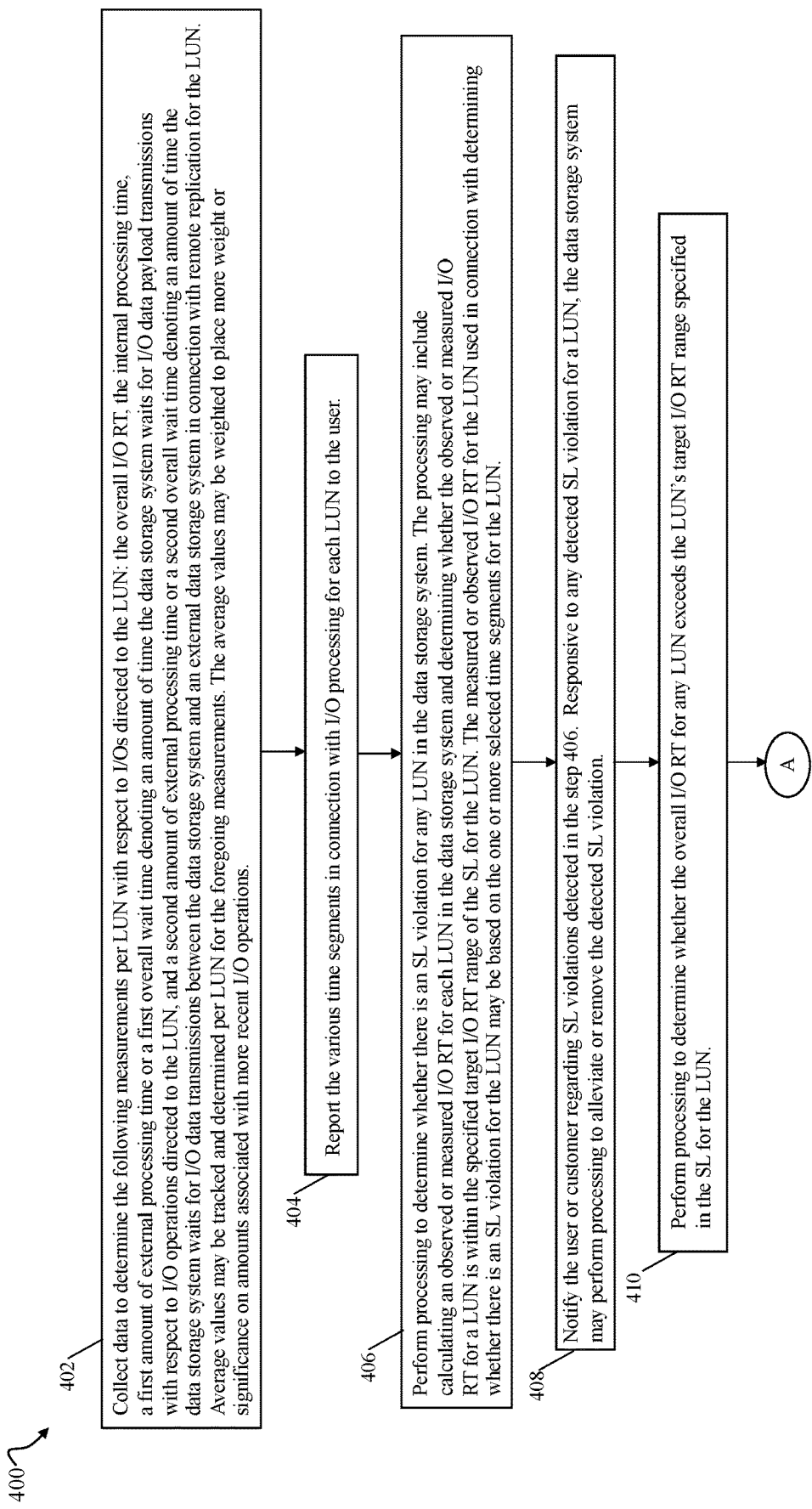
FIGS. 9A and 9B are flowcharts of processing steps that may be performed in an embodiment in accordance with the techniques herein.
Figure 9B:
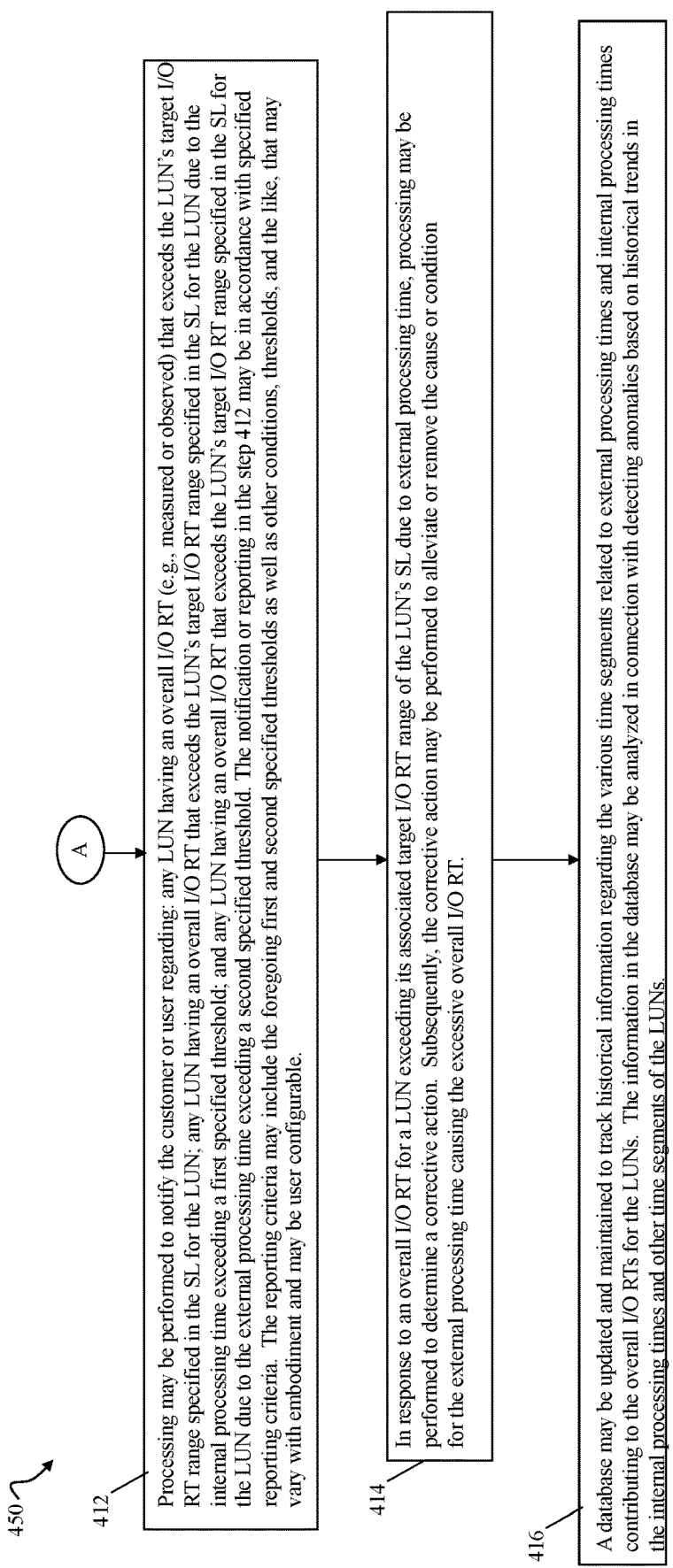

Referring to FIGS. 9A and 9B, shown is a flowchart 400, 450 of processing steps that may be performed in an embodiment in accordance with the techniques herein. The steps of FIGS. 9A and 9B are described in more detail below.

In the step 402, in at least one embodiment in accordance with the techniques herein, the data storage system may track and determine the following measurements per LUN with respect to I/Os directed to the LUN: the overall I/O RT, the internal processing time (e.g., the amount of time spent with respect to processing performed internally within the data storage system to service the I/Os directed to the LUN), a first amount of external processing time or a first overall wait time denoting an amount of time the data storage system waits for I/O data payload transmissions with respect to I/O operations directed to the LUN, and a second amount of external processing time or a second overall wait time denoting an amount of time the data storage system waits for I/O data transmissions between the data storage system and an external data storage system in connection with remote replication for the LUN. In at least one embodiment, average values may be tracked and determined per LUN for the foregoing measurements. In at least one embodiment, the average values may be weighted to place more weight or significance on amounts associated with more recent I/O operations.

In at least one embodiment, subsequent to the step 402, the step 404 may be performed where the data storage system may report to the user per LUN regarding the various time segments in connection with I/O processing for a LUN. The various time segments for the LUN, determined and reported with respect to I/Os directed to the LUN, may include average values for each of the following (as collected and determined in the step 402): the overall I/O RT, the internal processing time, the first amount of external processing time or the first overall wait time denoting an amount of time the data storage system waits for I/O data payload transmissions with respect to I/O operations directed to the LUN, and the second amount of external processing time or the second overall wait time denoting an amount of time the data storage system waits for I/O data transmissions between the data storage system and an external data storage system in connection with remote replication for the LUN.

In at least one embodiment, the reporting of the various time segments in the step 404 may be performed in any suitable manner. For example, information may be displayed to the user via a GUI of a management application, included in a report provided to the user, and the like. In at least one embodiment using a management GUI, the user may select to view or receive the reported time segments for one or more selected LUNs.

By collecting and reporting the foregoing time segments to the user in the step 404, the user obtains a finer granularity regarding the various individual time segments contributing to the overall I/O RT for a LUN. Such information may provide the user with better insight and information, for example, in connection with troubleshooting and identifying problems and bottlenecks resulting in excessive I/O RTs.

In at least one embodiment, when reporting on an external time segment (e.g., either the first amount or the second amount of external processing time), the step 404 may also include reporting path information for the LUN. For example, when reporting on the first amount of external processing time related to the amount of time the data storage system waits for I/O data payload transmissions for the LUN, the path information reported may identify the one or more paths over which the LUN is exposed to one or more hosts. The path information may include, for example, the host initiator WWN, the host name (e.g., of the host including the host initiator WWN), the SAN fabric name or identifier, the target port WWN, the identifier of the switch and switch port(s) included in the path, and the like. The path information may be used, for example, in subsequent processing steps to facilitate trouble shooting or determining causes for excessive external processing times.

Subsequent to the step 404, the step 406 may be performed. In the step 406, processing may be performed to determine whether there is an SL violation for any of the LUNs of the data storage system. Generally, such a determination regarding an SL violation may be performed at any suitable time such as periodically based on a predetermined time interval. The processing of the step 406 may include calculating an observed or measured I/O RT for each LUN in the data storage system and determining whether the observed or measured I/O RT for a LUN is within the specified target I/O RT range of the SL for the LUN. The measured or observed I/O RT for the LUN used in connection with determining whether there is an SL violation for the LUN may be based on the one or more selected time segments for the LUN. In at least one embodiment, average values as described herein may be used for the one or more selected time segments for the LUN.

As discussed elsewhere herein, an SL violation may be determined by comparing an observed or measured I/O RT for a LUN to a target I/O RT range specified by the SL associated with the LUN. Thus, prior to the step 406, the one or more time segments used in calculating the measured or observed I/O RT for each LUN may be selected or configured. For example, a user may select one or more of the time segments discussed herein to be used in calculating the observed or measured I/O RT for a LUN using the GUI of the management application. In at least one embodiment, a default setting may identify the one or more time segments used in calculating the observed or measured I/O RT for a LUN. The default setting may be used "by default" if the user does not further configure or modify the specified time segments selected for use in calculating the observed I/O RT for the LUN. For example, the default setting may indicate to use only the internal processing time when calculating the measured I/O RT for the LUN used in determining whether there is an SL violation for the LUN with respect to the target I/O RT range for the LUN. A user may further modify or configure the time segments included in the measured I/O RT, for example, by selecting to also include one or more of the other additional time segments related to external processing time.

Additionally, prior to the step 406, an SL may be specified for each LUN in the data storage system. In at least one embodiment, an SL may be specified for each LUN when the LUN is provisioned or configured. In at least one embodiment, the SL may be specified at the SG level, where the SG includes one or more LUNs.

From the step 406, control proceeds to the step 408. At the step 408, the user or customer may be notified regarding any SL violations of LUNs detected in the step 406. The notification may be made in any suitable manner. For example, the notification may be made to the user via the GUI of the data storage management application. The notification may be made using other electronic means, for example, such as by electronic mail (email) notification.

Additionally in the step 408, responsive to any detected SL violation for a LUN, the data storage system may perform processing to alleviate or remove the detected SL violation. Consistent with discussion herein, the data storage system may perform processing related to internal operations within the data storage system to attempt to alleviate or remove the SL violation. For example, assume the LUN's observed I/O RT used in connection with determining the SL violation is calculated only based on internal processing time for the LUN. Also assume the LUN has an associated platinum SL as described herein where the LUN's observed I/O RT is 2 millisecond thereby exceeding the 1 millisecond target I/O RT maximum value. The data storage system may perform processing to reduce the RT for the LUN. Such processing may include allocating additional resources for use in connection with servicing the LUN where such additional resources may be reallocated from other LUNs having a lower priority SL than platinum. For example, the data storage system may allocate additional cache and/or CPU time for use in servicing I/Os directed to the LUN. Additionally, in the step 408, responsive to a detected SLO violation for a LUN, the path information for all paths over which the LUN is exposed may be reported out with the SLO violation.

From the step 408, control proceeds to the step 410. At the step 410, processing may be performed to determine whether the overall I/O RT for any LUN exceeds the LUN's target I/O RT range specified in the SL for the LUN. From the step 410, control proceeds to the step 412.

At the step 412, processing may be performed to notify the customer or user regarding: any LUN having an overall I/O RT (e.g., measured or observed) that exceeds the LUN's target I/O RT range specified in the SL for the LUN; any LUN having an overall I/O RT that exceeds the LUN's target I/O RT range specified in the SL for the LUN due to the internal processing time exceeding a first specified threshold; and any LUN having an overall I/O RT that exceeds the LUN's target I/O RT range specified in the SL for the LUN due to the external processing time exceeding a second specified threshold. The notifications or reports in the step 412 may be in accordance with any specified reporting criteria. The reporting criteria may include the foregoing first and second specified thresholds. In at least one embodiment, the reporting criteria may be user specified and user configurable. In at least one embodiment, the reporting criteria may be set to one or more default criteria which the user may further modify or configure.

In connection with the step 412, the first specified threshold may denote a threshold amount of time for the internal processing time segment for the LUN. The first specified threshold may be any suitable amount. For example, the first specified threshold may indicate an absolute numeric value, such as in milliseconds. The first specified threshold may be expressed as a percentage of the maximum or minimum target RT range of the SL for the LUN. For example, the SL for a LUN may be gold as noted elsewhere herein where the target RT range indicates that the average observed I/O RT for the LUN be greater than 1.5 milliseconds and also less than 2.0 milliseconds. In this case, the first specified threshold may be 80% of the maximum RT, or 80% of 2.0 milliseconds which is 1.6 milliseconds. In this case, the step 412 may notify the customer that the overall I/O RT exceeds the target I/O RT range for the LUN due to internal processing time when the overall I/O RT for the LUN exceeds the target RT range (e.g., is 2.0 milliseconds or more) and also when the internal processing time exceeds the first threshold of 1.6 milliseconds. The reporting criteria may also require that the foregoing condition exist for at least a minimum consecutive time period. For example, the step 412 processing may notify the customer that the overall I/O RT exceeds the target I/O RT range for the LUN due to internal processing time when: 1) the overall I/O RT for the LUN exceeds the target RT range (e.g., is 2.0 milliseconds or more); 2) the internal processing time exceeds the first threshold of 1.6 milliseconds; and 3) when both the conditions of 1) and 2) are held for a minimum number of seconds.

In connection with the step 412, the second specified threshold may denote a threshold amount of time for the external processing time for the LUN. The external processing time may be the sum of the first amount of external processing time or the first overall wait time denoting an amount of time the data storage system waits for I/O data payload transmissions with respect to I/O operations directed to the LUN, and the second amount of external processing time or the second overall wait time denoting an amount of time the data storage system waits for I/O data transmissions between the data storage system and an external data storage system in connection with remote replication for the LUN. The second specified threshold may be any suitable amount. For example, the second specified threshold may indicate an absolute numeric value, such as in milliseconds. The second specified threshold may be expressed as a percentage of the maximum or minimum target RT range of the SL for the LUN. For example, the SL for a LUN may be gold as noted elsewhere herein where the target RT range indicates that the average observed I/O RT for the LUN be greater than 1.5 milliseconds and also less than 2.0 milliseconds. In this case, the second specified threshold may be 30% of the maximum RT, or 30% of 2.0 milliseconds which is 0.6 milliseconds. In this case, the step 412 may notify the customer that the overall I/O RT exceeds the target I/O RT range for the LUN due to external processing time when the overall I/O RT for the LUN exceeds the target RT range (e.g., is 2.0 milliseconds or more) and also when the external processing time exceeds the second threshold of 0.6 milliseconds. The reporting criteria may also require that the foregoing condition exist for at least a minimum consecutive time period. For example, the step 412 processing may notify the customer that the overall I/O RT exceeds the target I/O RT range for the LUN due to external processing time when: 1) the overall I/O RT for the LUN exceeds the target RT range (e.g., is 2.0 milliseconds or more); 2) the external processing time exceeds the second threshold of 0.6 milliseconds; and 3) when both the conditions of 1) and 2) are held for a minimum number of seconds.

Generally, the reporting criteria may include criteria applied in connection with notifications in the step 412. Such reporting criteria may be applied to avoid providing notification to the user or customer, for example, when a current state or condition causing the overall I/O RT to exceed the target I/O RT range of the LUN's SL is for an insubstantial or insignificant amount of time. In this case, what is insubstantial or insignificant may be determined with respect to customer or user specified conditions included in the reporting criteria.

As another example, the reporting criteria applied in connection with the step 412 may indicate to notify a user or customer if the overall I/O RT of a LUN exceeds the target I/O RT range of the LUN's SL for at least "XX" continuous seconds, where "XX" may be a positive integer.

As another example, the reporting criteria applied in connection with the step 412 may indicate to notify a user or customer if the overall I/O RT of a LUN exceeds the target I/O RT range of the LUN's SL and if at least YY % of the observed I/Os have an overall I/O RT that exceeds the target I/O RT range, where YY is a positive integer value between 1 and 100 denoting a percentage.

As another example, the reporting criteria applied in connection with the step 412 may indicate to notify a user or customer if the overall I/O RT of a LUN exceeds the target I/O RT range of the LUN's SL at least Z times within a specified amount of time, where Z is a positive integer value and the specified amount of time denotes a continuous time interval such as 5 seconds.

In connection with the step 412, for a LUN having an overall I/O RT that exceeds the LUN's target I/O RT range specified in the SL for the LUN due to the internal processing time exceeding a first specified threshold, it may be determined that the internal processing time is a primary or main cause as to why the LUN's overall I/O RT exceeds the target I/O RT range. In this case, the data storage system administrator or other persons responsible for the data storage system may be notified to further investigate internal data storage processing that may be the cause of the excessive overall I/O RT for the LUN.

In connection with the step 412, for a LUN having an overall I/O RT that exceeds the LUN's target I/O RT range specified in the SL for the LUN due to the external processing time exceeding a second specified threshold, it may be determined that the external processing time is a primary or main cause as to why the LUN's overall I/O RT exceeds the target I/O RT range. In this case, the SAN and/or host administrator may be notified to further investigate external conditions (e.g., external with respect to the data storage system) that may be the cause of the excessive overall I/O RT for the LUN. For example, such external conditions may be related to conditions in the SAN and/or on a host connected to the data storage system. Thus, the SAN and host administrators may further investigate causes for the excessive overall I/O RT.

From the step 412, control proceeds to the step 414. At the step 414, in response to an overall I/O RT for a LUN exceeding its associated target I/O RT range of the LUN's SL (e.g., in the steps 410 and 412) due to external processing time, processing may be performed determine a corrective action. Subsequently, the corrective action may be performed to alleviate or remove the cause or condition for the detected excessive overall I/O RT due to the external processing time. In at least one embodiment, the corrective action may be performed automatically. As a variation, an embodiment may perform the corrective action automatically after review and confirmation by a user such as a data storage administrator or other appropriate personnel. To further illustrate, the steps 410 and 412 may determine that the overall I/O RT for a LUN A exceeds the target I/O RT range of the LUN A's SL due to external processing time. Further analysis may include examining the first amount of external processing time or the first overall wait time denoting an amount of time the data storage system waits for I/O data payload transmissions with respect to I/O operations directed to the LUN A. The foregoing time segment associated with waiting for I/O data payload transmissions for LUN A may account for the entire external processing delay for the LUN A. Yet further analysis may examine the path information indicating the one or more paths over which the LUN A is exposed to a host H1 that has issued I/Os to the LUN A. Assume that the LUN A is exposed to the host H1 over only a first target port of the data storage system and that 100 other LUNs are also exposed to the host H1 through the same first target port. The 100 other LUNs may all have associated SLs ranked with a lower priority than the SL of platinum associated with LUN A. In this case, the data storage system may perform processing to use the first target port exclusively with I/Os directed to the LUN A and not the other 100 LUNs. In at least one embodiment, the data storage system may implement this change by rezoning or making zoning changes in the switch between the host and the data storage system. For example, the data storage system may use target drive zoning to implement the desired zoning changes. As a variation, the data storage system may not make zoning changes. Rather the data storage system may perform remasking or make changes to masking information so that only I/O's directed to LUN A are allowed through the first target port. The masking information may be updated to indicate that I/Os directed to the other 100 LUNs are not allowed through the first target port. For example, with reference back to FIG. 5, the masking information may be updated to define an entry for the host H1, where the entry includes a first PG that includes the first target port, an SG that includes only LUN A, and an IG that includes the one or more initiators of the host H1 allowed to issue I/Os to the LUN A. The masking information may also be updated to remove the first target port from a second PG used to expose the other 100 LUNs to one or more initiator of the host H1. More generally, the data storage system may implement the desired behavior noted above in any suitable manner.

In the step 412, in response to an overall I/O RT for a LUN exceeding its associated target I/O RT range of the LUN's SL (e.g., in the steps 410 and 412) due to external processing time, processing performed may include further examining the first amount of external processing time or the first overall wait time denoting an amount of time the data storage system waits for I/O data payload transmissions with respect to I/O operations directed to the LUN, as well as the second amount of external processing time related to the amount of time associated with I/O data transmissions between the data storage system and an external data storage system in connection with remote replication for the LUN. Such processing may analyze the foregoing first and second amounts of external processing times in order to determine which one may be considered a primary or main cause of the excessive external processing time. For example, the first amount of external processing time may be compared to a first minimum threshold and, if the first amount exceeds the first minimum threshold, the first amount of external processing time may be considered a primary or main cause for the excessive external processing time. In a similar manner, the second amount of external processing time may be compared to a second minimum threshold and, if the second amount exceeds the second minimum threshold, the second amount of external processing time may be considered a primary or main cause for the excessive external processing time. If the first amount of external processing time is determined to be a primary or main cause for the excessive external processing time, possible corrective actions that may be taken include remasking or rezoning such as discussed above. If the second amount of external processing time is determined to be a primary or main cause for the excessive external processing time, possible corrective actions that may be taken include using additional or different RDF links for remote data replication of write data for the LUN. For example, RDF link reassignments may be performed so that the one or more RDF links used for remote replication of the LUN's write data may be used exclusively for the LUN. As a variation, the one or more RDF links used for remote replication of the LUN's write data after link reassignment may have reduced replication data traffic when compared to the replication data traffic associated with one or more other RDF links prior to the link reassignment.

From the step 414, control proceeds to the step 416. At the step 416, processing may be performed to update and maintain a database tracking historical information over time regarding the various time segments related to external processing times and internal processing times contributing to the overall I/O RTs for the LUNs. The step 416 may include updating the database to include any recently acquired data. The information in the database may be analyzed in connection with detecting anomalies based on historical trends in the internal processing times and other time segments of the LUNs. For example, the database internal processing times with respect to a set of LUNs may be analyzed to detect a pattern of increasing internal processing time over a defined time period. The set of LUNs may store information on the same set of BE PDs that are flash drives whereby the increased internal processing time may indicate a problem with the flash drives.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O (input/output) operations in a data storage system comprising:
   receiving a plurality of I/O operations directed to a first logical device, wherein the first logical device is associated with a first service level specifying a target I/O response time goal;
   receiving a first input identifying whether to calculate a first observed I/O response time for the first logical device using only an internal processing time associated with processing performed within the data storage system when servicing I/O operations directed to the first logical device;
   determining, in accordance with the first input and the plurality of I/O operations directed to the first logical device, the first observed I/O response time for the first logical device;
   determining a first service level violation for the first logical device whereby the first observed I/O response time violates the first service level; and
   responsive to determining the first service level violation whereby the first observed I/O response time violates the first service level, performing first processing to alleviate or remove the first service level violation.

2. The method of claim 1, wherein the first input is a user configurable input and identifies one or more time segments used to calculate the first observed I/O response time for the first logical device, and wherein the one or more time segments are selected from a plurality of predefined time segments.

3. The method of claim 2, wherein the plurality of predefined time segments includes the internal processing time and includes an external processing time.

4. The method of claim 3, wherein the first input includes only the internal processing time and excludes the external processing time associated with processing performed externally with respect to the data storage system when servicing I/O operations directed to the first logical device.

5. The method of claim 3, wherein the external processing time is a first external processing time denoting an amount of time the data storage system waits for write I/O data payload to be received by the data storage system when servicing write I/O operations directed to the first logical device and denoting an amount of time the data storage system waits for read I/O data payload to be transmitted from the data storage system to an external client that requested the read I/O data when servicing read I/O operations directed to the first logical device.

6. The method of claim 5, wherein the plurality of predefined time segments includes a second external processing time denoting an amount of time the data storage system waits for I/O data transmissions between the data storage system and an external data storage system in connection with remote replication of the first logical device.

7. The method of claim 6, wherein the first input includes the internal processing time and the first external processing time, and wherein the first input excludes the second external processing time.

8. The method of claim 6, wherein the first input includes the internal processing time and the second external processing time, and wherein the first input excludes the first external processing time.

9. The method of claim 3, wherein an overall I/O response time for the first logical device includes the plurality of predefined time segments with respect to I/O operations directed to the first logical device, and wherein the plurality of predefined time segments includes an internal I/O processing time for the first logical device denoting only the internal processing time with respect to I/O operations directed to the first logical device and an overall external processing time for the first logical device denoting only the external processing time with respect to I/O operations directed to the first logical device.

10. The method of claim 9, further comprising:
    sending a notification responsive to determining that the overall I/O response time for the first logical device is not in accordance with the target I/O response time goal of the first service level and that one or more conditions included in reporting criteria are met.

11. The method of claim 9, wherein a specified threshold is included in user specified reporting criteria, and the method further comprises:
    sending a notification responsive to determining that the overall I/O response time for the first logical device is not in accordance with the target I/O response time goal of the first service level and that the internal I/O processing time for the first logical device exceeds the specified threshold.

12. The method of claim 9, wherein a specified threshold is included in user specified reporting criteria, and the method further comprises:
 sending a notification responsive to determining that the overall I/O response time for the first logical device is not in accordance with the target I/O response time goal of the first service level and that the overall external I/O processing time for the first logical device exceeds the specified threshold.

13. The method of claim 1, wherein the first observed I/O response time is an average I/O response time determined with respect to a plurality of I/O response times for the plurality of I/O operations directed to the first logical device.

14. The method of claim 1, wherein the target I/O response time goal specifies a target I/O response time range.

15. The method of claim 14, wherein determining the first service level violation for the first logical device further comprises:
 determining whether the first observed I/O response time is included in the target I/O response time range of the first service level;
 responsive to determining the first observed I/O response time is included in the target I/O response time range, determining that the first observed I/O response time does not violate the first service level; and
 responsive to determining the first observed I/O response time is not included in the target I/O response time range, determining the first service level violation whereby the first observed I/O response time violates the first service level.

16. The method of claim 1, wherein the first processing includes increasing an allocation of one or more resources of the data storage system for use when processing I/O operations directed to the first logical device.

17. The method of claim 1, wherein the first service level and a second service level are included in a plurality of predefined service levels having an associated priority ranking, wherein the second service level has a lower priority that the first service level in the associated priority ranking, and wherein the first processing includes reassigning a first resource from a second logical device having the second service level to the first logical device having the first service level.

18. The method of claim 1, wherein a first overall wait time for the first logical device denotes an amount of time the data storage system waits for I/O data payload transmissions with respect to I/O operations directed to the first logical device, and wherein a second overall wait time for the first logical device denotes an amount of time the data storage system waits for I/O data transmissions between the data storage system and an external data storage system in connection with remote replication for the first logical device, and wherein the method further comprises:
 reporting the overall I/O response time for the first logical device, the first overall wait for the first logical device time, the second overall wait time for the first logical device, and the internal processing time.

19. A system comprising:
 one or more processors; and
 one or more memories comprising code stored thereon that, when executed, performs a method of processing I/O (input/output) operations in a data storage system comprising:
  receiving a plurality of I/O operations directed to a first logical device, wherein the first logical device is associated with a first service level specifying a target I/O response time goal;
  receiving a first input identifying whether to calculate a first observed I/O response time for the first logical device using only an internal processing time associated with processing performed within the data storage system when servicing I/O operations directed to the first logical device;
  determining, in accordance with the first input and the plurality of I/O operations directed to the first logical device, the first observed I/O response time for the first logical device;
  determining a first service level violation for the first logical device whereby the first observed I/O response time violates the first service level; and
  responsive to determining the first service level violation whereby the first observed I/O response time violates the first service level, performing first processing to alleviate or remove the first service level violation.

20. A computer readable medium comprising code stored thereon that, when executed, performs a method of processing I/O (input/output) operations in a data storage system comprising:
 receiving a plurality of I/O operations directed to a first logical device, wherein the first logical device is associated with a first service level specifying a target I/O response time goal;
 receiving a first input identifying whether to calculate a first observed I/O response time for the first logical device using only an internal processing time associated with processing performed within the data storage system when servicing I/O operations directed to the first logical device;
 determining, in accordance with the first input and the plurality of I/O operations directed to the first logical device, the first observed I/O response time for the first logical device;
 determining a first service level violation for the first logical device whereby the first observed I/O response time violates the first service level; and
 responsive to determining the first service level violation whereby the first observed I/O response time violates the first service level, performing first processing to alleviate or remove the first service level violation.

* * * * *